(12) United States Patent
Yoshida

(10) Patent No.: US 7,485,082 B2
(45) Date of Patent: Feb. 3, 2009

(54) TOOL CHANGER AND MACHINE TOOL EQUIPPED WITH THE TOOL CHANGER

(75) Inventor: Makoto Yoshida, Aichi (JP)

(73) Assignee: Okuma Corporation, Aichi (JP)

( * ) Notice: Subject to any disclaimer, the term of this patent is extended or adjusted under 35 U.S.C. 154(b) by 276 days.

(21) Appl. No.: 11/243,601

(22) Filed: Oct. 5, 2005

(65) Prior Publication Data

US 2006/0079384 A1    Apr. 13, 2006

(30) Foreign Application Priority Data

Oct. 8, 2004  (JP)  ............................. 2004-296913
Sep. 9, 2005  (JP)  ............................. 2005-262409

(51) Int. Cl.
*B23Q 3/157* (2006.01)

(52) U.S. Cl. ................... 483/7; 483/37; 483/41

(58) Field of Classification Search .............. 483/7, 483/37, 41
See application file for complete search history.

(56) References Cited

U.S. PATENT DOCUMENTS 3,613,225 A * 10/1971 Sato et al. .................. 483/45
4,654,954 A * 4/1987 Bayes et al. .................. 483/40
5,093,978 A * 3/1992 Binder ......................... 483/43
5,820,536 A    10/1998 Sato
5,823,722 A    10/1998 Takenaka
6,074,329 A * 6/2000 Hirano et al. .................. 483/15

FOREIGN PATENT DOCUMENTS

| | | | |
|---|---|---|---|
| GB | 2082484 A | * | 3/1982 |
| JP | 438335 | | 3/1992 |
| JP | 08004989 | | 11/1994 |
| JP | 8141863 | | 6/1996 |
| JP | 9131637 | | 5/1997 |

* cited by examiner

*Primary Examiner*—Dana Ross
(74) *Attorney, Agent, or Firm*—Gauthier & Connors LLP

(57) ABSTRACT

A tool changer, used for exchanging tools between a tool magazine and a tool spindle of a machine tool, includes a tool-changing unit and a feed screw. The tool-changing unit has a rotating shaft with a changing arm attached to one end thereof and a rotating drive motor attached to the other end thereof. The feed screw has one end to which a drive motor is attached to cause the tool-changing unit to perform a feed operation of a tool and also perform detachment/attachment of the tool by utilizing the feed operation. Additionally, the feed screw is parallel to a rotational axis of the tool spindle positioned at a tool-changing position.

20 Claims, 13 Drawing Sheets

TOOL CHANGER AND MACHINE TOOL EQUIPPED WITH THE TOOL CHANGER

CROSS-REFERENCE TO RELATED APPLICATIONS

The entire disclosure of Japanese Patent Applications Nos. 2004-296913 and 2005-262409 including their specifications, claims, drawings, and abstracts is incorporated herein by reference.

BACKGROUND OF THE INVENTION

1. Field of the Invention

The present invention relates to a tool changer that is disposed between a tool magazine and a tool spindle of a machine tool to perform exchange of tools, and also relates to a machine tool equipped with the tool changer.

2. Description of the Related Art

A conventional tool changer that is capable of automatically replacing a tool attached to a tool spindle of a machine tool with another tool prepared in a tool magazine, as disclosed in the Japanese Patent Laid-Open Publication No. Hei 8-141863, performs the exchange of tools by pulling, pushing, or rotating a changer arm shaft holding a tool that is driven, via a plurality of cams, by a motor or the like. However, this kind of tool changer requires a large cam box and accordingly the overall size of this apparatus becomes larger. Furthermore, because transporting a tool from a remote tool magazine to the tool spindle or vice versa is difficult, the tool changer must be disposed between the tool spindle of the machine tool and the tool magazine, and also disposed in close proximity to them. Accordingly, a heavy device must be disposed at an upper part of the machine tool, whereby the machine size is further increased.

To solve the above-described problem, Japanese Utility Model Publication No. Hei 8-4989 discloses, as shown in FIG. 12, a compact tool changer equipped with a servo motor for controlling a pulling/pushing motion of a changer arm shaft, and another servo motor for controlling a rotating motion of the changer arm shaft, without using a large cam box. As shown in FIG. 12, the rotations of two servo motors 212 and 213 are controlled by an NC apparatus for rotating and pulling/pushing a tool-changing arm 211. An arm shaft 209 has circumferential grooves 209b, functioning as a lifting or lowering rack, on its cylindrical surface formed at one end, and has a spline 209a formed at the other end. A pinion 225 meshing with the circumferential grooves 209b is driven (i.e. rotated) by the first servo motor 213. A pinion 210 meshing with a gear 218 is driven (i.e. rotated) by the second servo motor 212. The gear 218 has a female spline coupled with the spline 209a. However, like the above-described conventional tool changer, because transporting a tool from a remote tool magazine to the tool spindle or vice versa is difficult, this type of tool changer must be disposed between the tool spindle of a machine tool and the tool magazine, and also disposed in close proximity to them.

Meanwhile, tool changers have recently been required to perform long-duration, automated operation. To satisfy such a requirement, the tool changer must hold many replacement tools. However, according to the above-described conventional tool changer, structural restrictions require that the tool changer be disposed between the tool spindle and the tool magazine and also disposed in close proximity to them, making it difficult to increase the size of the tool magazine. Furthermore, attaching a plurality of tool magazines to the tool changer is also difficult. Thus, realizing a long-duration, automated operation is not easy.

If such a tool magazine capable of holding many tools is disposed far from the tool spindle, exchanging tools will require that the tool changer have an appropriate transporting mechanism to transport a tool, while the tool is held with the changing arm, from the remote tool magazine to the tool spindle, or vice versa. However, the above-described conventional tool changer has no capability of transporting tools between the tool spindle and the tool magazine.

Japanese Patent Laid-Open Publication No. Hei 9-131637 discloses a method for enabling a system to perform exchange of tools by transporting a tool from a remote, large-capacity tool magazine to a tool-changing position of a tool spindle. The apparatus proposed in this prior art document includes a tool-changing unit that performs both a pulling/pushing motion and a rotating motion of a tool-changing arm. The tool-changing unit can be shifted along a guide rail that is provided separately. Furthermore, as shown in FIG. 13, Japanese Utility Model Laid-Open Publication No. Hei 4-38335 discloses a tool-changing method including a step of picking up a tool with a sub-arm 323, without directly holding and transporting the tool from a remote tool magazine 309; a step of transporting a shift base 321, which carries the sub-arm 323, to a ready station 310 of the tool spindle; and a step of performing exchange of tools by means of a conventional tool changer between the ready station and a tool spindle 306.

The above-described tool changer that holds and transports a tool from a remote tool magazine to a tool-changing position is very large in size, and accordingly an enlarged space is required for installing this machine tool. Especially, such a large tool changer cannot be incorporated into a general combined machining apparatus or into a vertical-type machining center. Furthermore, if a mechanism for transporting a tool and a mechanism for exchanging the tools are provided independently, the entire structure of the system will become complicated, and the reliability and accuracy of operations will be lowered. Moreover, according to the above-described method using a ready station for performing exchange of tools, accomplishing this operation requires a relatively long time.

Because a conventional tool changer has been required to be disposed between tool spindle of a machine tool and a tool magazine, and also disposed in close proximity to them, the layout of constituent parts of the machine tool has been significantly restricted, and accordingly realizing a compact machine tool has been difficult. Furthermore, maintaining the tool changer clean has been impossible, because of difficulty in arranging the tool changer so as to usually be disposed outside a machining area and conveyed into this area only when the tool-changing operation is carried out.

It may be possible to modify a conventional tool changer so as to perform, as an integrated operation, both transportation and exchange of tools, if the changer arm shaft driven to perform rotating and pulling/pushing motions is extendable. However, when the changer arm shaft is used to hold and transport a tool from a plurality of tool magazines, a practically required pulling/pushing length of the arm will reach approximately 1 m. Such a long length will not be practically realized when structural restrictions of the tool changer are taken into consideration.

Furthermore, if a long-duration, automated operation is performed, a tool tip position may change due to wear and tear occurring during a machining operation. In such a case, after accomplishing the exchange of tools, the tip position of a replacement tool must be confirmed and corrected before the next machining operation with this tool is started. However, a conventional tool changer that cannot transport a tool has difficulty in incorporating such an operation as part of a sequential tool-changing operation. Thus, accomplishing the tool-changing operation requires a long period of time.

SUMMARY OF THE INVENTION

In view of the above problems, an object of the present invention is to provide a compact tool changer that is capable of holding and transporting a tool from a remote tool magazine to a tool-changing position and that, by virtue of having an integrated structure, is also capable of increasing the operation accuracy in performing exchange of machining tools.

Another object of the present invention is to provide a compact machine tool that can realize a flexible layout of a tool magazine, a tool spindle, and a tool changer and that has a structure for storing the tool changer.

Yet another object of the present invention is to provide a tool changer capable of speedily accomplishing the exchange of machining tools, as well as confirmation of tool conditions.

To accomplish the above and other related objects, in one aspect of the present invention, there is provided a tool changer used for exchanging tools between a tool magazine and a tool spindle of a machine tool. This tool changer includes a tool-changing unit and a feed screw. The tool-changing unit includes a rotating shaft, with a changing arm attached to one end of the rotating shaft and a rotating drive motor attached to the other end of the rotating shaft. The feed screw has one end to which a drive motor is attached to thus cause the tool-changing unit to perform a feed operation of a tool and also to perform detachment/attachment of the tool by utilizing the feed operation. The feed screw is parallel to a rotational axis of the tool spindle positioned at a tool-changing position.

Furthermore, according to this aspect of the present invention, there is preferably provided a reduction gear unit having an input shaft and an output shaft provided coaxially with each other between the changing arm and the rotating drive motor.

Furthermore, to accomplish the above and other related objects, in another aspect of the present invention there is provided a tool changer including a tool-changing unit, a straight guide rail, and a feed screw. The tool-changing unit includes a rotating shaft, with a changing arm attached to one end of the rotating shaft and a rotating drive motor attached to the other end of the same. The straight guide rail guides the tool-changing unit in a shift direction. The feed screw has one end to which a drive motor is attached to shift the tool changing-unit along the guide rail to perform a feed operation of a tool. The drive motor rotates the feed screw to cause the tool-changing unit to shift from a storing position and stop at a tool delivery position where a tool is detached from a tool magazine, and at a tool-changing position where the tool is attached to a tool spindle, while rotation of the feed screw is utilized to perform detachment/attachment of the tool at the tool delivery position as well as at the tool-changing position. In addition, the tool-changing unit rotates the changing arm at the tool delivery position as well as at the tool-changing position.

Furthermore, according to this aspect of the present invention, a reduction gear unit having an input shaft and an output shaft provided coaxially with each other is preferably provided between the changing arm and the rotating drive motor.

Furthermore, the feed screw is preferably disposed outside a maximum rotation circle or inside a minimum rotation circle of the tool held by the changing arm.

Furthermore, the changing arm preferably holds a tool in such a manner that the tip of the tool is positioned at the same side as a rotating motor or at the opposite side.

Furthermore, the objects of the present invention can be realized by using the above-described tool changer for a plurality of tool magazines disposed along the feed screw within a feed-shifting range of the tool-changing unit.

Furthermore, the objects of the present invention can be realized by a machine tool equipped with the above-described tool changer, including a detector, located in close proximity to a shifting locus of the tool held by the changing arm within a feed-shifting range of the tool changing unit, for measuring a tool length and a tool diameter of the tool, and a unit configured to execute, on the basis of an output of this detector, tool length correction and tool breakage detection by utilizing a feed-shifting operation of the tool-changing unit.

Moreover, the objects of the present invention can be realized by a machine tool equipped with the above-described tool changer, including a detector attached to the tool-changing unit, and a unit configured to measure, on the basis of an output of this detector, a tool diameter or a tool length of the tool magazine by utilizing a feed-shifting operation of the tool-changing unit.

The tool changer according to the present invention is compact, and is capable of holding and transporting a tool from a remote tool magazine to a tool-changing position and, by virtue of its integrated structure, is also capable of increasing the operation accuracy in performing exchange of tools.

The above and other objects, features, and advantages of the present invention will become more apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention, in which.

DESCRIPTION OF PREFERRED EMBODIMENTS

Hereinafter, preferred embodiments of the present invention will be explained with reference to the attached drawings.

First Embodiment

Figure 1:
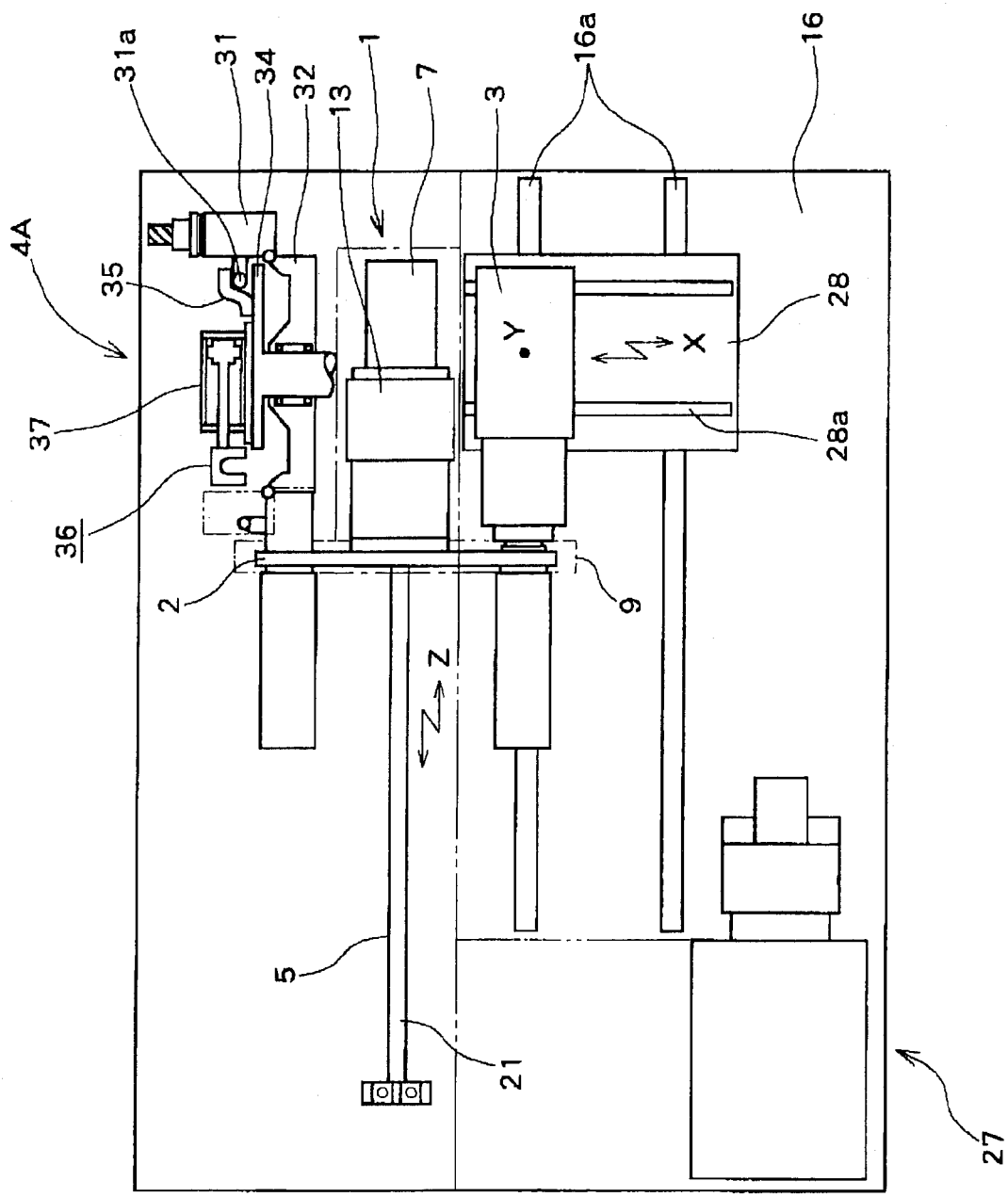
FIG. 1 is a front view showing the arrangement of a machine tool equipped with a tool changer according to a first embodiment of the present invention.
Figure 2A:
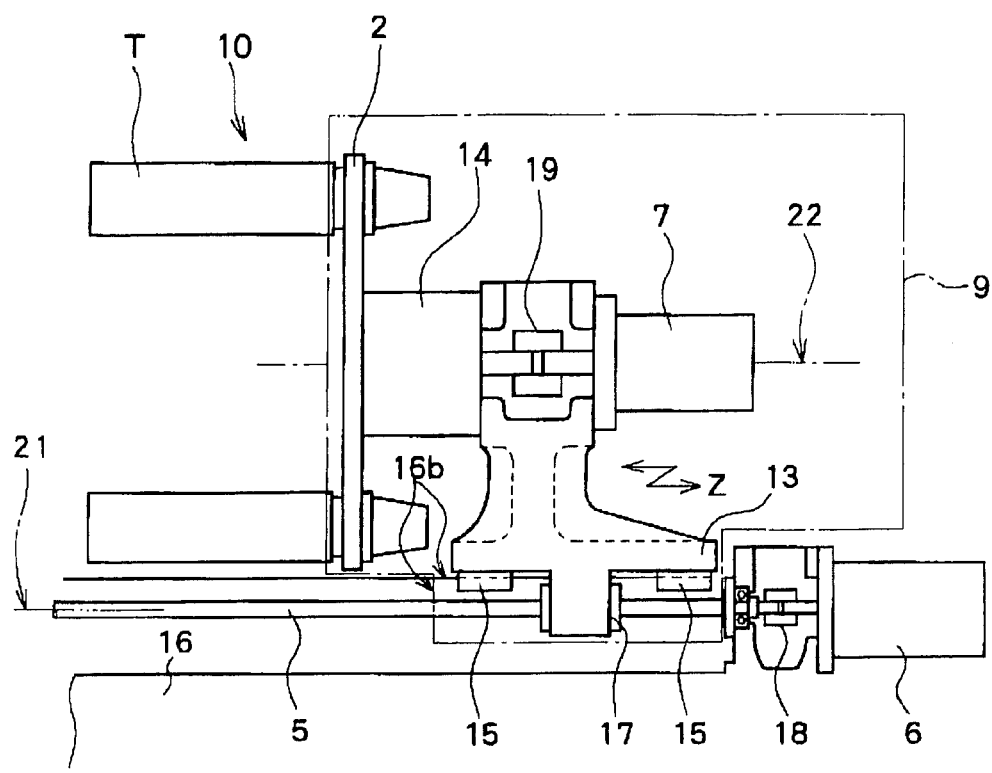
FIGS. 2A and 2B are side views explaining the arrangement of an essential portion of the tool changer in according to the first embodiment.
Figure 2B:
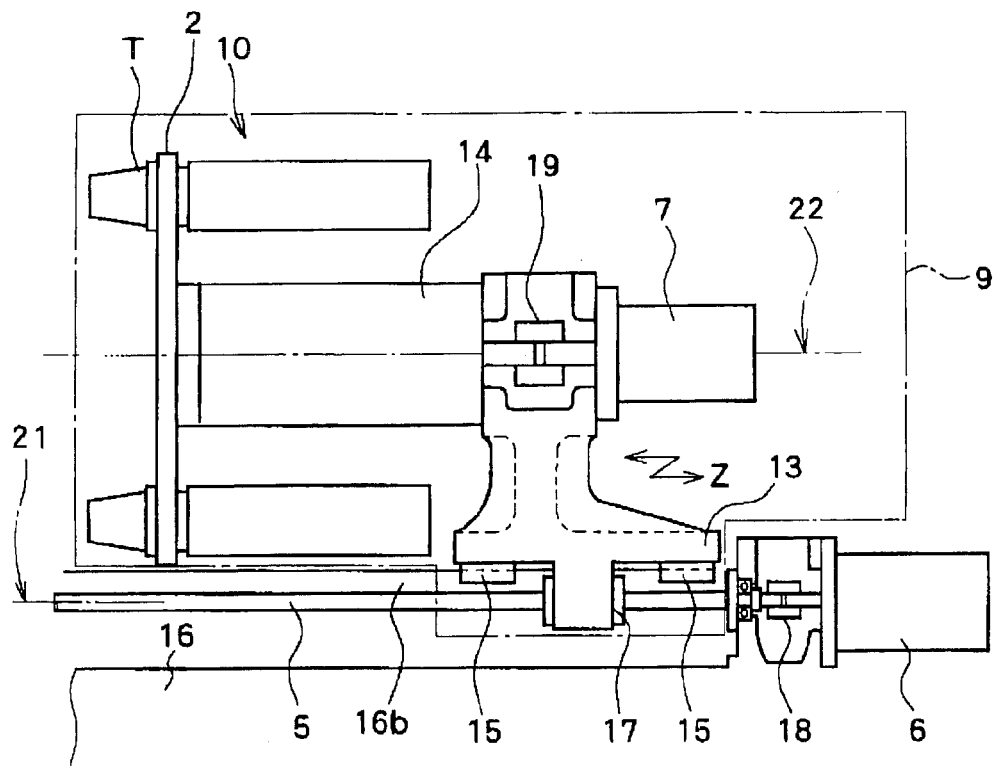
Figure 3:
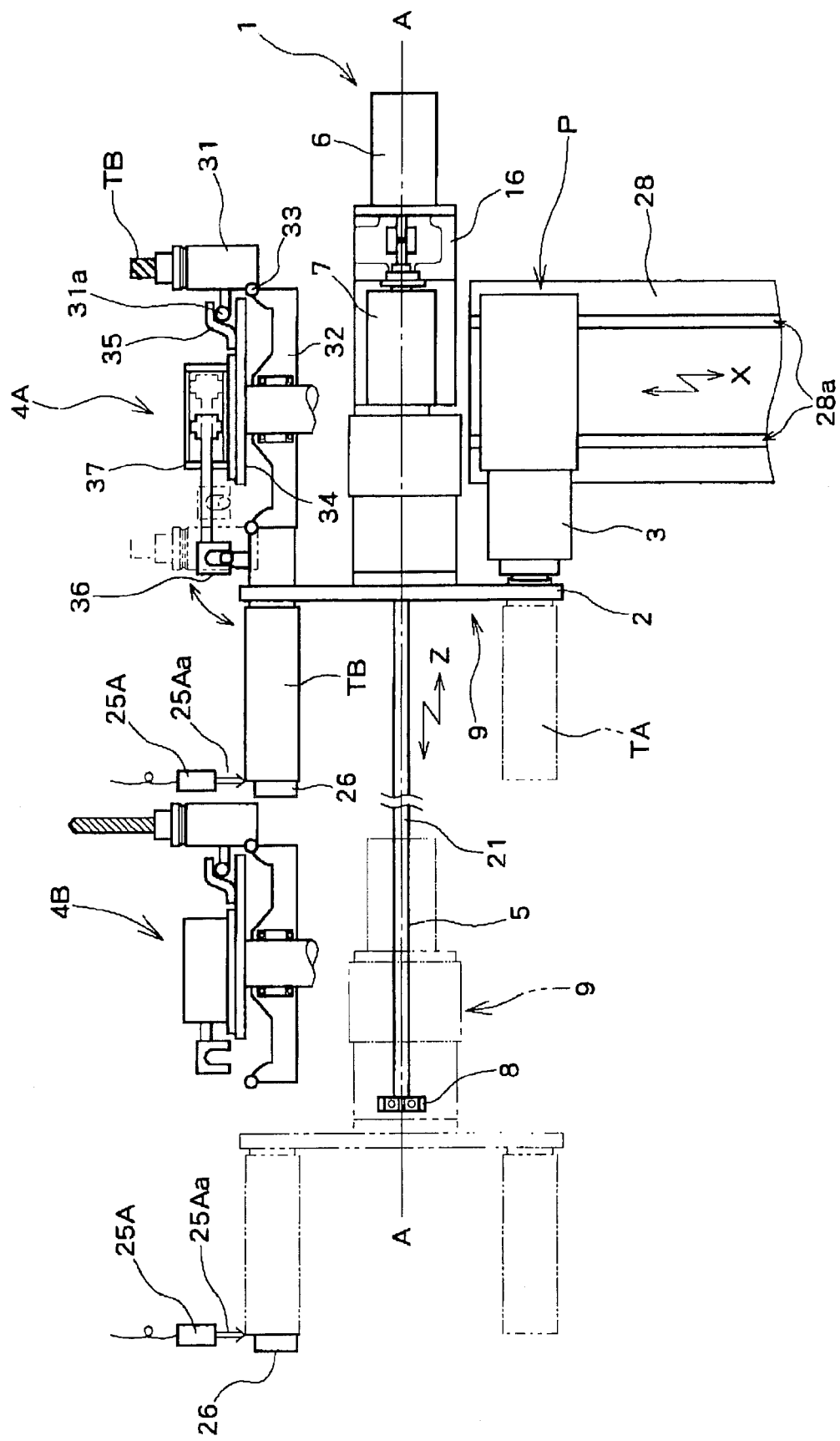
FIG. 3 is a view showing a tool changer used for a plurality of tool magazines according to the first and fifth embodiments of the present invention.

FIG. 1 is a front view showing a machine tool equipped with a tool changer according to a first embodiment of the present invention. FIGS. 2A and 2B are side views explaining the arrangement of an essential part of the tool changer taken along a plane A-A including axes of first and second motors of the tool changer shown in FIG. 3. FIG. 3 is a view showing the tool changer disposed between a tool spindle and two or more tool magazines to perform delivery of tools.

A lathe serving as the machine tool of the first embodiment shown in FIG. 1 includes a tool changer 1, a tool spindle 3, a work spindle 27, and a tool magazine 4A. The machine tool of the present embodiment is not limited to a lathe; the present invention is applicable to a machining center that includes a table used for shifting and positioning a workpiece fixed thereon and holds a tool spindle in a horizontal or vertical condition to perform a machining operation and is also applicable to other machine tools.

In FIG. 1, the tool spindle 3 can slide along guide rails 28a extending in an X-axis direction. The guide rails 28a are fixed on a saddle 28 that can slide along guide rails 16a extending in a Z-axis direction. The guide rails 16a are fixed on a machine-tool fixing portion 16. The X-axis direction is normal to the axis of the tool spindle 3, and the Z-axis direction is parallel to the axis of the tool spindle 3. The tool magazine 4A is located other side of the saddle 28. The tool changer 1 is disposed between the tool magazine 4A and the tool spindle 3 and is parallel thereto.

The tool spindle 3 causes a turning motion about a Y axis to thereby cut a workpiece while sliding along the guide rails 28a in the X-axis direction. When a machining tool being used is replaced with another one, the tool spindle 3 is positioned as shown in FIG. 1 in such a manner that its axis becomes parallel to the Z axis at a tool-changing position located at one end of the saddle 28. FIG. 1 shows the tool spindle 3 just after being positioned at the tool-changing position. Furthermore, as shown in FIG. 2A, the tool changer 1 has a tool-changing unit 9 that can be shifted by means of a feed screw and a feed screw mechanism attached to a machine-fixing portion 16. The tool-changing unit 9 has a main body 13, a second motor 7, a changing arm 2, and a supporting member 14 of the changing arm 2. The main body 13 includes guides 15 and a feed screw nut 17 attached to its bottom surface. Meanwhile, guide rails 16b, a feed screw 5, and a first motor 6 constituting the feed screw mechanism are attached on the machine-tool fixing portion 16. The guide rails 16b are disposed in parallel with the Z axis on the machine-tool fixing portion 16 so as to be disposed between the saddle 28 and the tool magazine 4A shown in FIG. 1.

The guides 15 provided on the bottom surface of the main body 13 of the tool changing unit can be slided in the Z-axis direction along the guide rails 16b. The feed screw 5 is located outside a maximum rotation circle of a tool held by the changing arm 2. The feed screw 5 is parallel to the guide rails 16b and is screwed into the feed screw nut 17 of the tool-changing unit 9 for shifting the main body 13. Furthermore, the feed screw 5 is connected to the first motor 6 via a joint 18. The feed screw 5 and the first motor 6 are arranged coaxially. With this arrangement, the tool-changing unit 9 can shift in the Z-axis direction when the first motor 6 rotates. Furthermore, the tool spindle 3 is parallel to the Z axis when it is located at the tool-changing position. Hence, a center line of the feed screw shaft 21 is parallel to the tool spindle 3 located at the tool-changing position.

The main body 13 of the tool changer has two parallel mounting surfaces facing opposite directions. The second motor 7 is attached to one mounting surface, and the supporting member 14 and the changing arm 2 are attached to the other mounting surface. These members are coaxial with a rotating axis 22 of the tool changer. A joint 19, provided inside the main body 13, connects the supporting member 14 to the second motor 7. The supporting member 14 is, for example, a simple bearing unit, or a compact planetary-gear-type reduction unit in the case where a large arm rotational torque is required to support a heavy tool. The changing arm 2, being a twin-rotating type, rotates about the rotating axis 22 of the tool changer when the second motor 7 rotates. The changing arm 2 can hold or grip a tool at a side opposite that of the second motor 7. Like the center line of the feed screw shaft 21, the rotating axis 22 of the tool changer is parallel to the tool spindle 3 located at the tool-changing position.

Regarding the arrangement of the tool magazine 4A, a rotary tool pot 31 stands on a disk 32 rotating about an axis parallel to the X axis as shown in FIG. 1. To hold the rotary tool pot 31 in such an upright position, a roller 31a protruding from the side surface of the rotary tool pot 31 is guided by a guide 35 provided on a stationary table 34. A cylinder 37, being hydraulically driven, is provided on an upper surface of the stationary table 34 of the tool magazine 4A. The cylinder 37 has a hook 36, being disposed in partially cutout the guide 35, so that the roller 31a of the rotary tool pot 31 can engage with a groove of this hook 36 at a predetermined position. The hook 36 of the cylinder 37 can move forward to cause the rotary tool pot 31 to swing by 90 degrees, and is arranged in such a manner that a tool can be delivered between the rotary tool pot 31 and the changing arm 2. The tool magazine 4A of the present embodiment includes a plurality of rotary tool pots 31 that are spaced at equal angular intervals and attached, via a pin 33 serving as a swing center, to the rotary disk 32 that is supported by the stationary table 34. Although not shown in the drawing, the operation of positioning each rotary tool pot 31 is carried out by means of a motor.

The tool magazine can be arranged as shown in FIG. 3, in which two tool magazines 4A and 4B are disposed along the feed screw shaft 21 of the tool changer 1 within a feed-shifting range of the feed screw 5. In a case where the tool magazines are disposed along a line parallel to the feed screw 5 as shown in FIG. 3, the length of the feed screw 5 should be extended according to the positions of respective tool magazines, and the extended end of the feed screw 5 can be supported by a bearing 8.

Figure 4A:
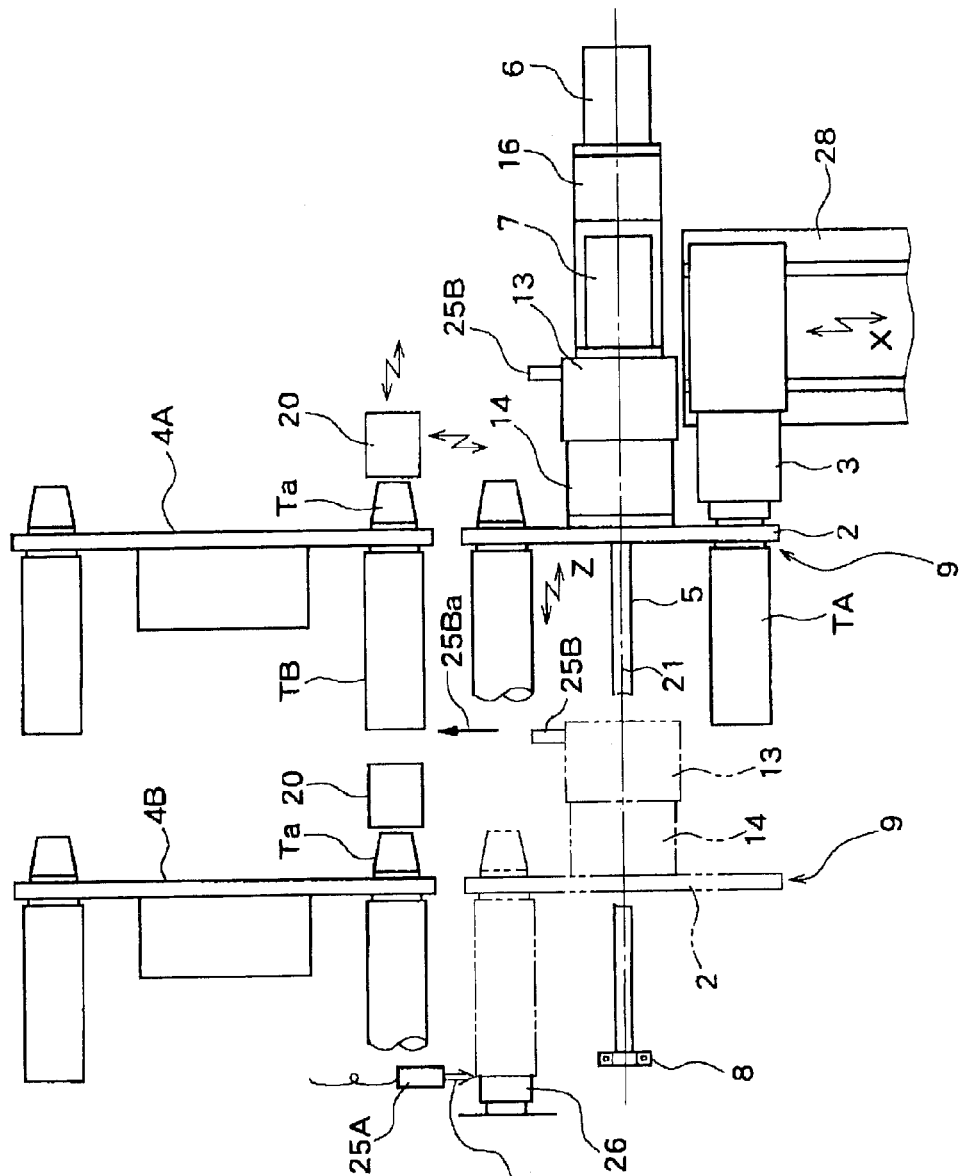
FIGS. 4A and 4B are views showing the arrangement of a machine tool equipped with a tool changer according to second and fourth embodiments of the present invention.
Figure 4B:
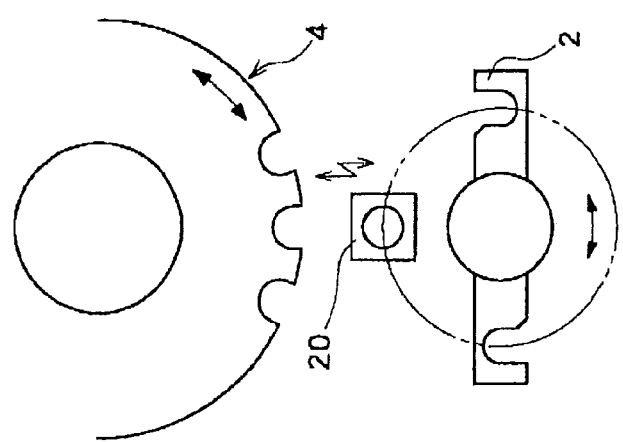

As shown in FIGS. 3, 4A, and 4B, sensors are used to detect a tool tip position and a tool diameter. More specifically, a non-contact sensor 25 or a contact sensor 26 is disposed on the machine-tool fixing portion 16. A non-contact sensor 25B is attached to the main body 13 of the tool changer.

According to the first embodiment of the present invention, appropriate motors can be used as the first motor 6 and the second motor 7, if their rotational angles can be controlled by a numerical controller of the machine tool; for example, if their rotational angles along the X axis and the Z axis of the machine tool can be controlled. Conventionally known detectors can be used for angle detection.

Next, a machining-tool changing operation performed in accordance with the first embodiment will be explained with reference to FIGS. 5A to 5D.

(1) The tool magazine 4A includes the rotary tool pot 31 attached to the outer periphery of the rotary disk and disposed at a predetermined angular position of the rotary disk. The rotary disk is disposed in the vicinity of the tool changer 1. The first tool magazine 4A stores a replacement tool TB at a position TB1. The roller 31a protruding from the side surface of the rotary tool pot 31 is guided by the guide 35 provided on the stationary table 34. The rotary tool pot 31 and the tool TB are held in the upright condition (refer to FIG. 5A).

Figure 5A:
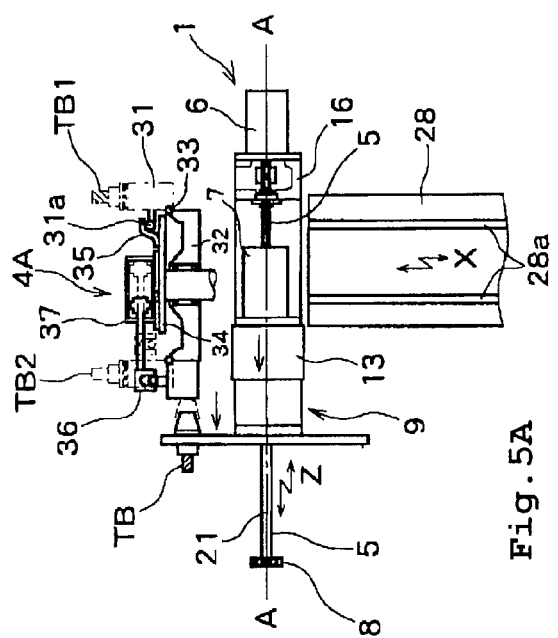
FIGS. 5A to 5D are views explaining an operation of the tool changer according to the first embodiment of the present invention.

(2) The tool magazine 4A is turned to position the tool TB to a tool pickup position TB2 (refer to FIG. 5A).

(3) Then, the cylinder 37 pushes the hook 36 outward to cause the rotary tool pot 31 to lean forward from the upright position to the horizontal position (refer to FIG. 5A).

(4) Meanwhile, the tool-changing unit 9 stops at a waiting position. Here, the waiting position is a position where the changing arm 2 receives a tool, when seen in the Z-axis direction, and is also a position where no interference, in angular position, occurs between the changing arm 2 and the rotary tool pot 31. Usually, the waiting position is in an angular position that forms an angle of 90 degrees or less relative to the position where the changing arm 2 delivers the tool, so that the time required to deliver a tool can be minimized (refer to FIG. 5A).

(5) Then, the second motor 7 of the tool-changing unit 9 is driven to cause the changing arm 2 to rotate so that the replacement tool TB can be held by one tool holder of the changing arm 2 (refer to FIG. 5A).

(6) Next, the first motor 6 is driven to rotate the feed screw 5 so that the tool-changing unit 9 can shift in the Z-axis direction to detach the tool TB from the tool magazine 4A. Furthermore, in a case where the saddle 28 of the tool spindle is located at a remote position due to a machining operation of the tool spindle performed with a tool TA, the tool-changing unit 9 can be shifted, by means of the feed screw 5, to an appropriate position adjacent to the saddle 28 (refer to FIG. 5A).

(7) The tool spindle 3, on which the used tool TA is attached, slides along the guide rails 28a of the saddle 28 extending in the X-axis direction and stops at a tool change position P. In this case, the tool spindle 3 is parallel to the Z axis (refer to FIG. 5B).

(8) Then, the first motor 6 is driven to rotate the feed screw 5 so that the tool-changing unit 9 can shift in the Z-axis direction. The tool-changing unit 9 reaches a position where the changing arm 2 receives the tool (refer to FIG. 5B).

Figure 5C:
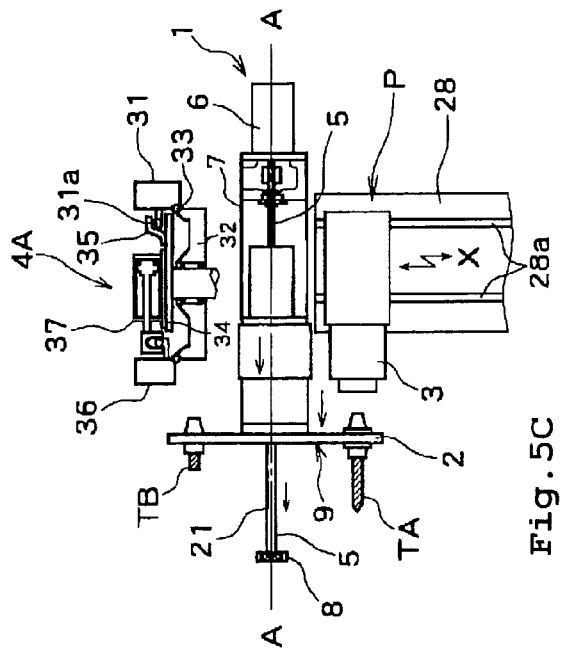
Figure 5B:
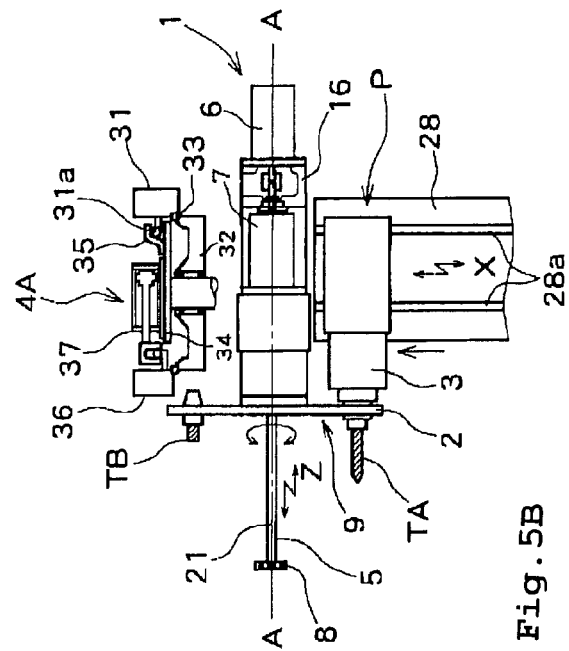

(9) Then, the second motor 7 rotates the changing arm 2 of the tool-changing unit 9 to catch the used tool TA with the other tool holder (refer to FIG. 5B).

(10) When the changing arm 2 receives the used tool TA, the first motor 6 rotates the feed screw 5 in the opposite direction to cause the tool-changing unit 9 to shift away from the tool spindle 3 along the Z axis, thereby detaching the used tool TA from the tool spindle 3 (refer to FIG. 5C).

Figure 5D:
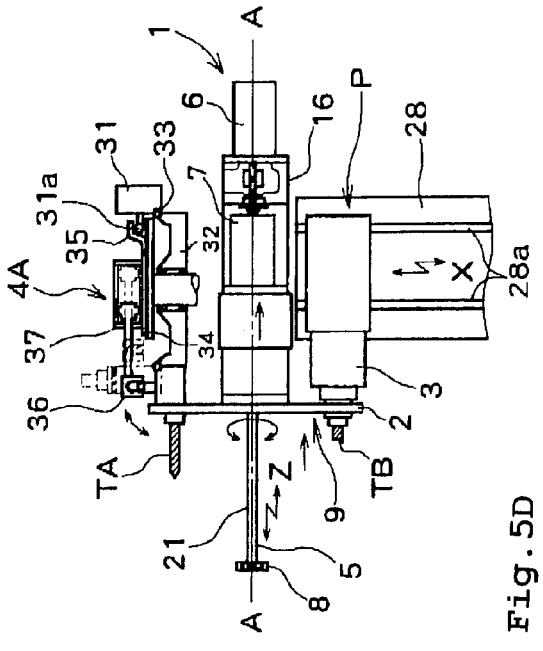

(11) Then, under the condition that the replacement tool TB is held by the other tool holder of the changing arm 2, the second motor 7 rotates the changing arm 2 by 180 degrees so that the axis of the replacement tool TB can be aligned with the axis of the tool spindle 3 (refer to FIG. 5D).

(12) Then, the first motor 6 rotates the feed screw 5 to shift the tool-changing unit 9 toward the tool spindle 3 along the Z axis, thereby attaching the replacement tool TB to the tool spindle 3 (refer to FIG. 5D).

(13) Then, the tool spindle 3 moves in the X-axis direction along the guide rails 28a, until it reaches a start point of the next machining operation in accordance with a program executed on the basis of the next sequence data (refer to FIG. 5D).

(14) The used tool TA is stored in the tool magazine (refer to FIG. 5D).

Through these steps, the tool-changing operation is accomplished.

FIG. 3 shows the arrangement of a tool changer used for two tool magazines; i.e., the first tool magazine 4A and the second tool magazine 4B, which are disposed in parallel to each other along the axial direction of the feed screw 5 so that numerous tools can be prepared for a long-duration machining operation. In this case, as shown in FIG. 3, the tool-changing unit 9 shifts in the Z-axis direction between a tool delivery position of the second tool magazine 4B and a tool delivery position of the tool spindle 3. As in the above-described tool-changing operation, such a shifting of the tool-changing unit 9 is performed by the first motor 6 that rotates the feed screw 5 screwed into the feed screw nut 17 of the tool-changing unit 9.

As described above, the first embodiment of the present invention enables the system to realize the shifting (or feeding) operation of a tool and the detaching/attaching operation of this tool, which is realized by using the feed screw 5 that is driven by the first motor 6 and screwed in the feed screw nut 17 of the tool-changing unit 9. Thus, the first embodiment of the present invention can provide a compact tool changer capable of increasing accuracy of the operation with an integrated structure. This embodiment allows usage of a long feed screw in a case where both the tool magazine and the tool changer must be located far from the tool spindle 3. Furthermore, as explained in step (6) of the tool-changing operation, the tool-changing unit 9 can be located in close proximity to the saddle 28 beforehand. Thus, no operation for shifting the saddle 28 to the position of tool magazine 4A is required after accomplishing the machining operation using the tool TA. Exchange of machining tools can be promptly performed by shifting the tool spindle 3 to the tool change position P. In this manner, the first embodiment of the present invention can realize a speedy sequential operation for shifting and exchanging the tools. According to the first embodiment, the second motor 7 is disposed at a side far from the tip of a tool held by the changing arm 2. This is effective in shortening the clearance between the main body 13 and the changing arm 2. Thus, a compact arrangement is realized. However, the present invention is not limited to such an arrangement. For example, as shown in FIG. 2B, the clearance between the main body 13 and the changing arm 2 can be expanded so that the second motor 7 can be disposed at a side adjacent to the tip of a tool held by the changing arm 2.

Second Embodiment

Next, a second embodiment of the present invention will be explained with reference to the attached drawings. Portions or elements identical with or similar to those disclosed in the first embodiment will be denoted by the same reference numerals, and their repeated descriptions are omitted. FIGS. 4A and 4B cooperatively show the second embodiment of the present invention. The machine tool shown in FIGS. 4A and 4B includes a first tool magazine 4A and a second tool magazine 4B. The center line of the feed screw shaft 21, the rotating axis 22 of the tool changer, and the axis of a stored tool are parallel to each other. The tool changer 1 of the present invention is applied to such a machine tool. This type of tool magazine does not have the rotary tool pot explained in the first embodiment. Accordingly, in order to realize delivery of tools between the changing arm 2 and the respective tool magazines 4A and 4B, a ready station tool pot 20 that shifts the tool is attached on a shank Ta of the tool.

Hereinafter, a tool-changing operation performed according to the second embodiment of the present invention will be explained, although descriptions of those operations identical with or similar. to those of the first embodiment are omitted.

(1) The ready station tool pot 20 advances in the Z-axis direction and engages with the shank Ta of the tool TB of the first tool magazine 4A.

(2) The ready station tool pot 20 coupled with the replacement tool TB shifts this tool to a point of intersection between a line connecting the first tool magazine 4A and the center of changing arm 2 and a locus of the center of a tool-holding portion of changing arm 2.

(3) Then, the second motor 7 rotates the changing arm 2 to hold the tool TB with one tool holder of the changing arm 2.

(4) Then, the ready station tool pot 20 shifts backward in the Z-axis direction to disengage the replacement tool TB from the shank Ta. In this case, as in the first embodiment, the tool-changing unit 9 can be shifted by means of the feed screw 5 so as to locate the tool-changing unit 9 in close proximity to the saddle 28 beforehand.

(5) As in the first embodiment, the tool spindle 3 stops at the tool change position P and its main axis is parallel to the Z axis.

(6) Then, the second motor 7 rotates the changing arm 2 to hold the used tool TA with the other tool holder.

(7) As in the first embodiment, when the changing arm 2 receives the used tool TA, the first motor 6 rotates the feed screw 5 in the opposite direction to cause the tool-changing unit 9 to shift away from the tool spindle 3 along the Z axis, there by detaching the used tool TA from the tool spindle 3.

(8) Then, the second motor 7 rotates the changing arm 2 by 180 degrees so that the axis of the replacement tool TB can be aligned with the axis of the tool spindle 3.

(9) Then, as in the first embodiment, the first motor 6 rotates the feed screw 5 to shift the tool-changing unit 9 toward the tool spindle 3 along the Z axis, thereby attaching the replacement tool TB to the tool spindle 3.

Although the operation of the second embodiment of the present invention has been explained with reference to the attached drawings, a plurality of second tool magazines 4B may be disposed along the feed screw 5 and the tool changer may be arranged to shift by means of the feed screw 5, thereby realizing a changing operation of tools supplied from a plurality of tool magazines, as explained in the first embodiment. In this case, as in the first embodiment, the length of the feed screw 5 should be extended according to the positions of respective tool magazines, and the extended end of the feed screw 5 can be supported by the bearing 8.

According to the second embodiment shown in FIGS. 4A and 4B, two operations; i.e. feed (or shifting) and detachment/attachment, for the tool TA can be realized by employment of only one feed screw 5 that is driven by the first motor 6. Therefore, the overall structure of the machine tool becomes compact, because members having a complicated structure and including numerous parts, such as a subarm or a shifting base, as well as a carrier guide connecting the tool spindle to serially disposed tool magazines, are no longer required. Hence, the second embodiment of the present invention can provide a simple, no-cost arrangement for realizing a tool-changing operation between the tool spindle and a plurality of tool magazines 4 located far from the spindle.

Third Embodiment

Figure 6:
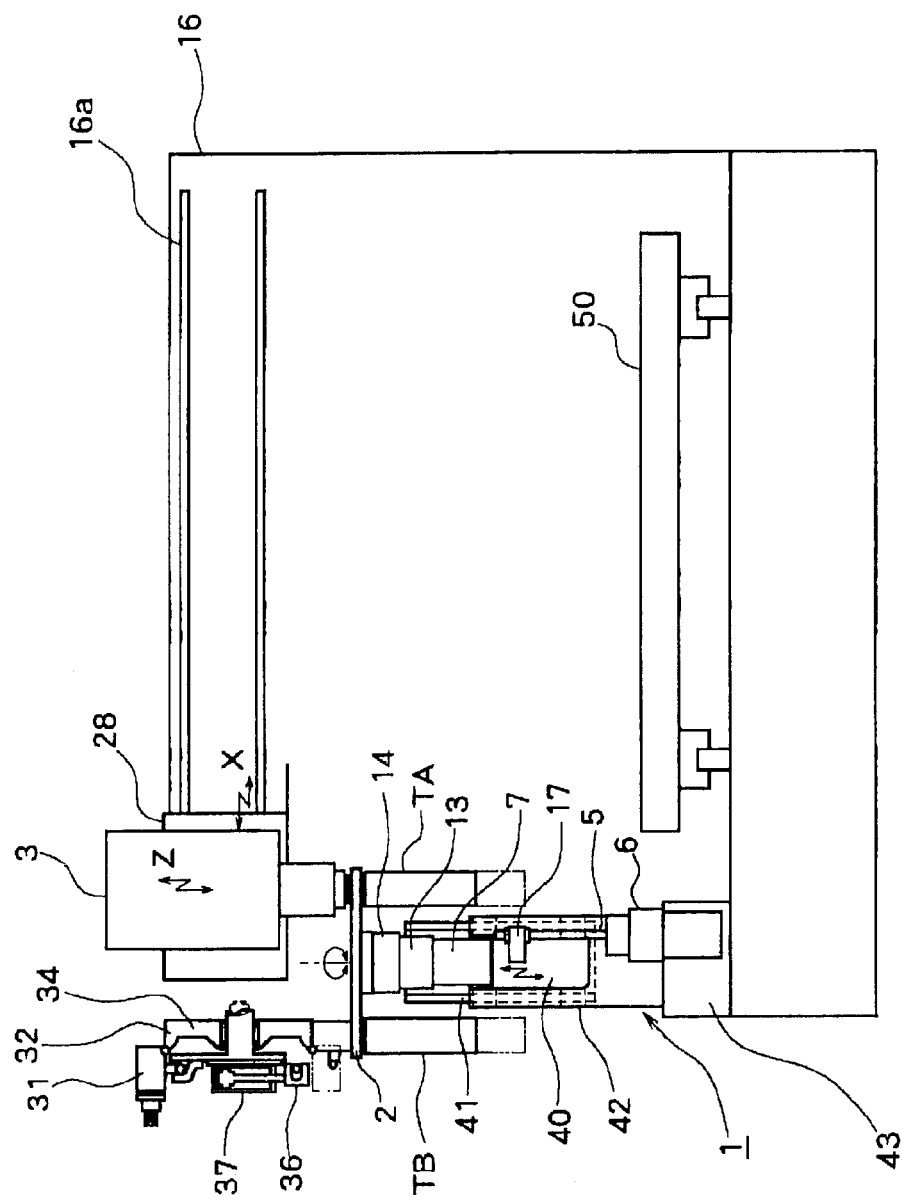
FIG. 6 is a view showing a vertical-type machining center equipped with a tool changer according to a third embodiment of the present invention.
Figure 7:
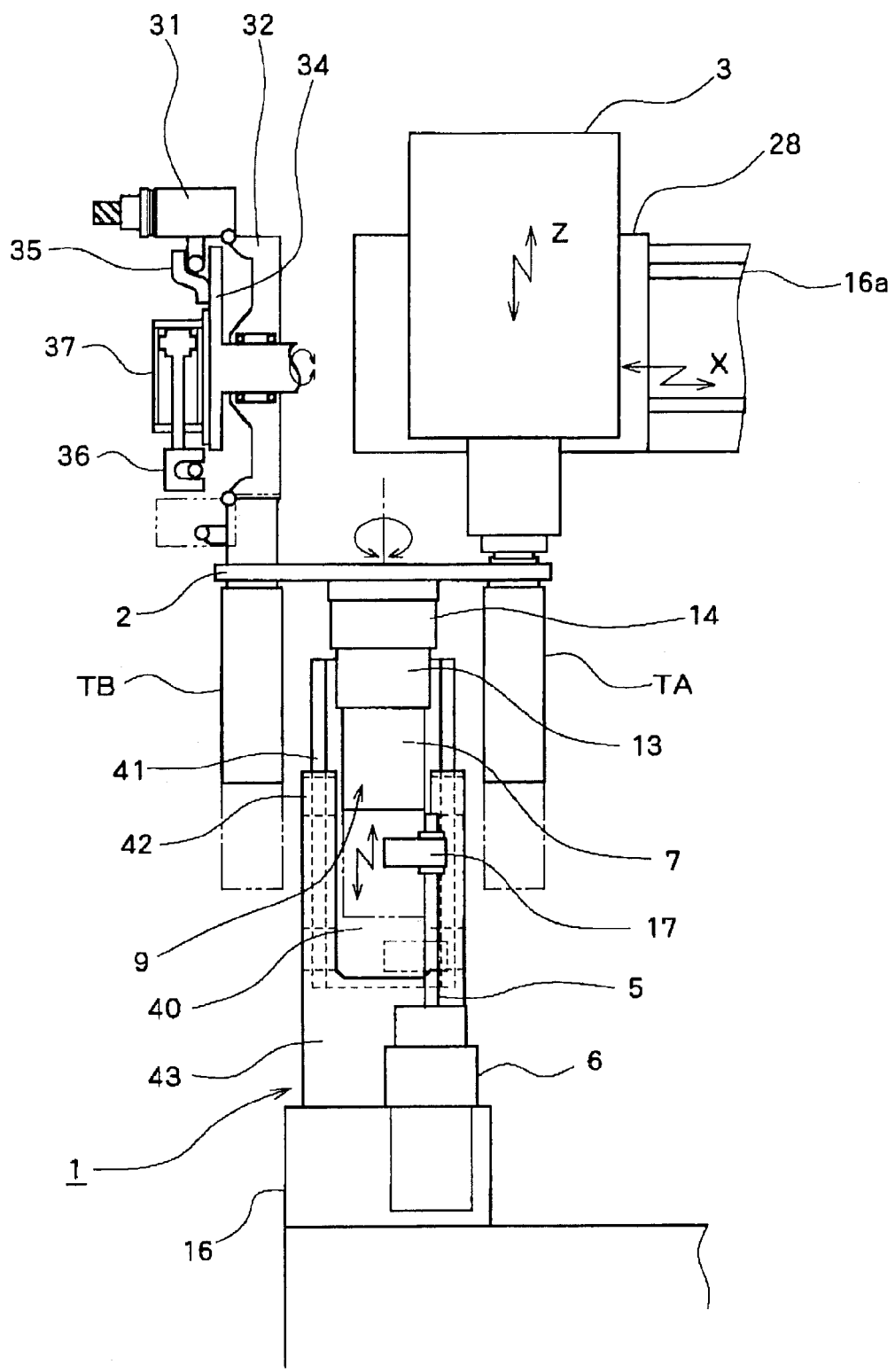
FIG. 7 is a front view showing the arrangement of the tool changer according to the third embodiment.
Figure 8:
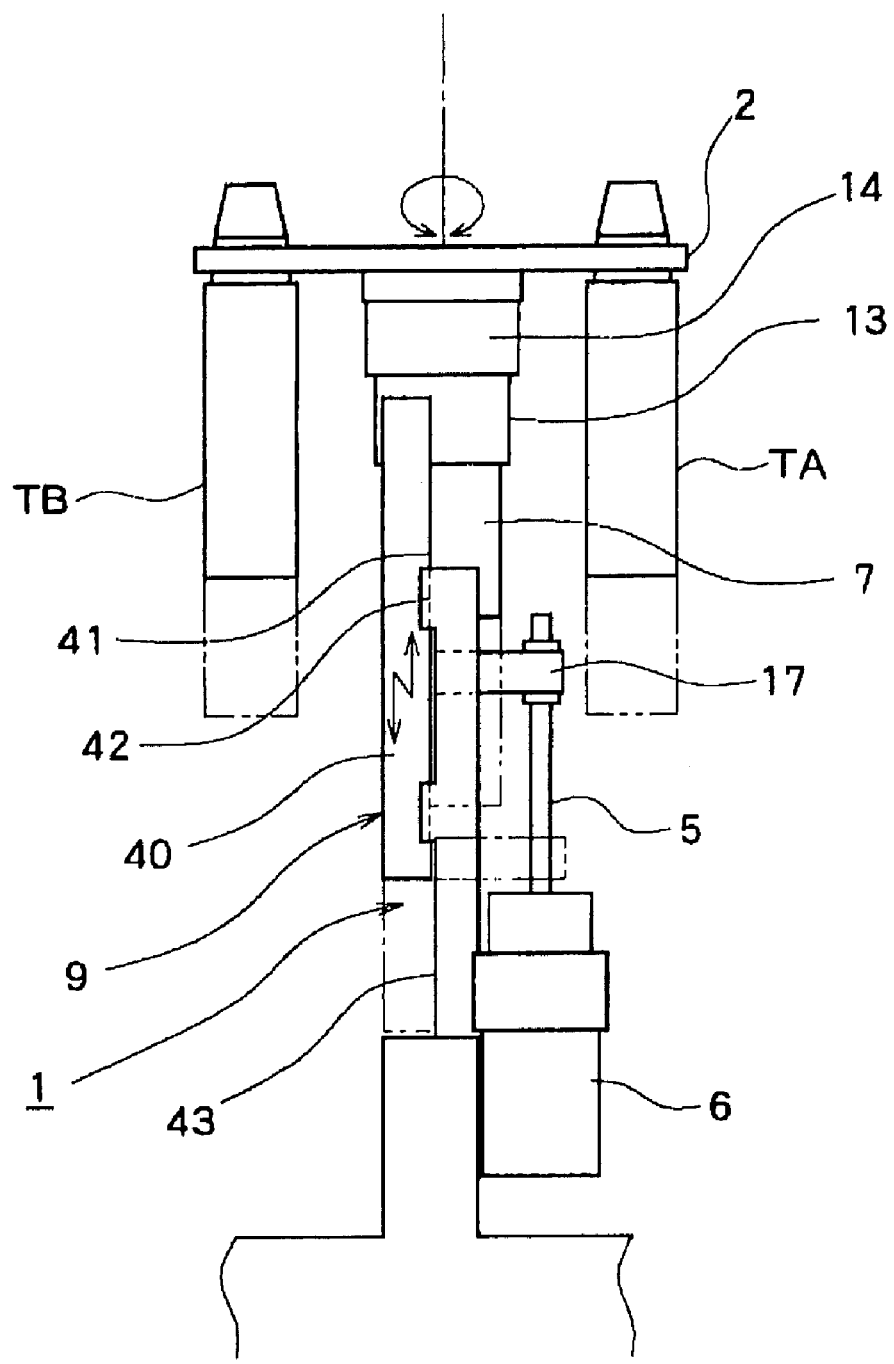
FIG. 8 is a side view showing the arrangement of the tool changer according to the third embodiment.
Figure 9:
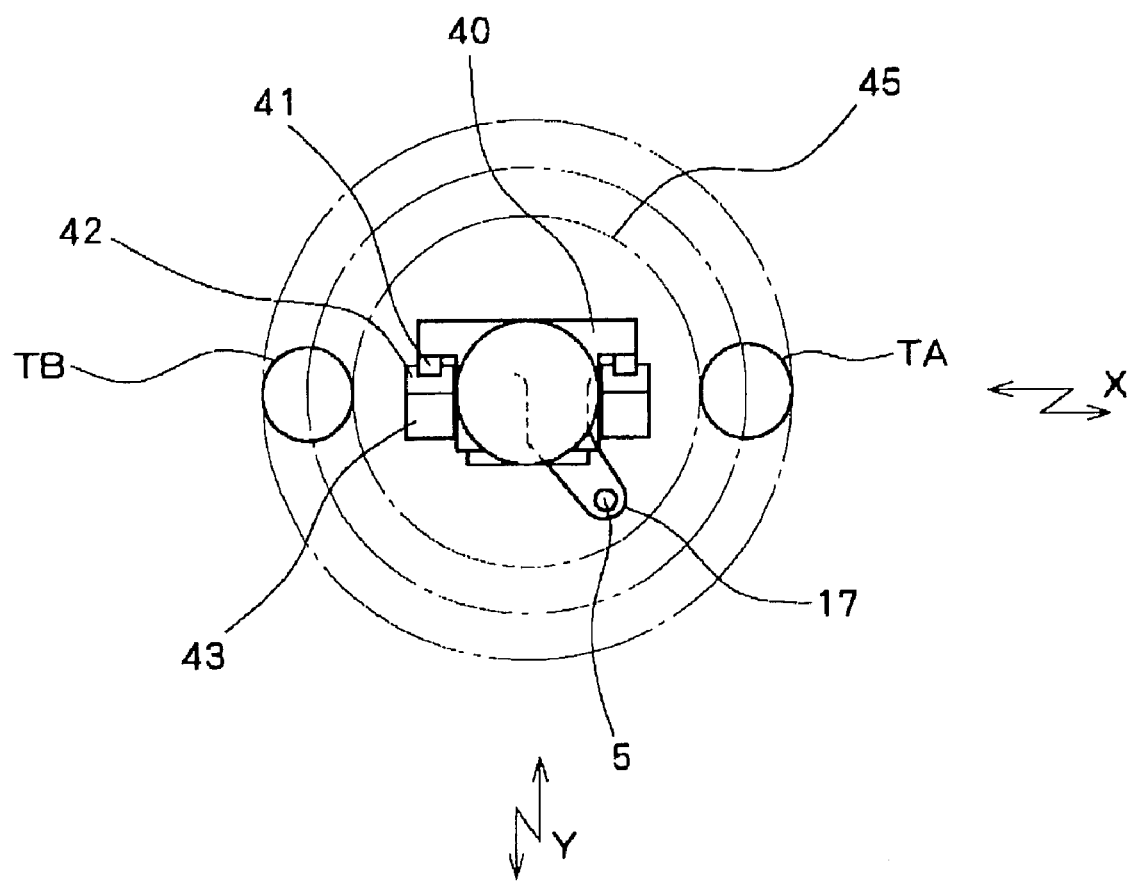
FIG. 9 is a plan view showing the arrangement of the tool changer according to the third embodiment.
Figure 10:
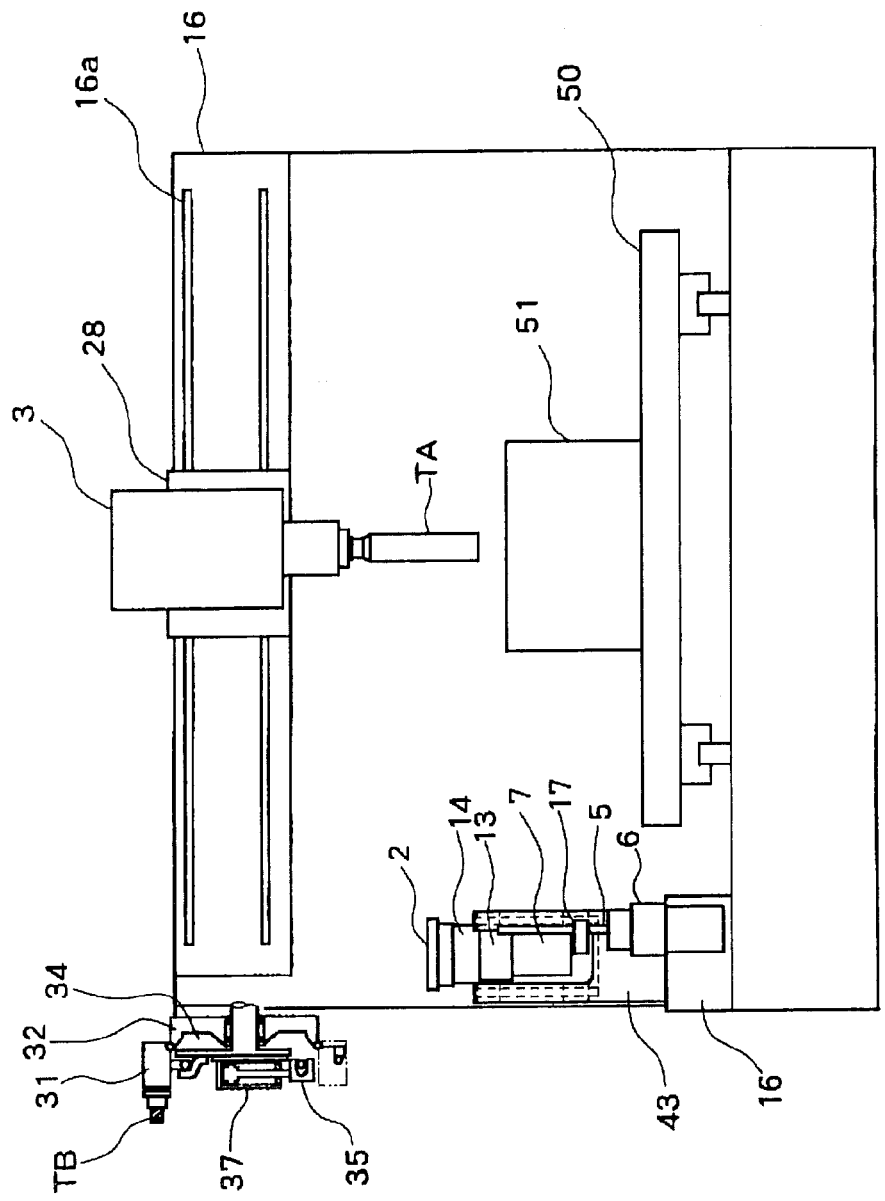
FIG. 10 is a view explaining a tool-changing operation according to the third embodiment.

Hereinafter, a third embodiment of the present invention will be explained with reference to FIGS. 6 to 9. Those portions or components identical with or similar to those disclosed in the first or second embodiment are denoted by the same reference numerals and their repeated descriptions are omitted. The third embodiment of the present invention discloses the tool changer 1 incorporated in a vertical-type machining center. FIG. 6 is a view showing the overall arrangement of the vertical-type machining center equipped with the tool changer. FIG. 7 is a front view of the tool changer. FIG. 8 is a side view of the tool changer. FIG. 9 is a plan view of the tool changer.

The vertical-type machining center shown in FIG. 6 includes the tool changer 1, the tool spindle 3, a table 50, and the tool magazine 4A. In FIG. 6, the tool spindle 3 can be shifted along the guide rails 28a extending in the vertical direction (hereinafter referred to as the Z-axis direction) of the saddle 28. The saddle 28 can be shifted along the guide rails 16a provided on the machine-tool fixing portion 16 so as to extend in the direction normal to the tool spindle 3 (hereinafter referred to as the X-axis direction). The tool magazine 4A is located other side of the saddle 28. The tool changer 1 is provided at a lower part of the machine tool so as to extend vertically between the tool magazine 4A and the tool spindle 3. The clearance between the central axis of the tool spindle 3 and the central axis of the tool pot 31 of the tool magazine 4A, being in an upright position, is equal to a rotational diameter of the center of the tool held by the changing arm 2. In order to maintain the tool changer clean, the installation position of the tool changer 1 is preferably surrounded with a shutter.

The tool spindle 3 shifts along the guide rails 16a extending in the X-axis direction and also shifts along the guide rails 28a extending in the Z-axis direction. As shown in FIG. 6, the tool spindle 3 is stopped at one end of the guide rails 16a when a tool-changing operation is performed. FIG. 6 shows the condition of the tool spindle 3 positioned at this tool-changing position. Furthermore, as shown in FIGS. 7, 8, and 9, the tool changer 1 includes the tool-changing unit 9 driven by the feed screw 5, and a tool-changer holding table 43. The tool-changing unit 9 has a plane base 40 to which the main body 13 is attached. The main body 13 mounts the second motor 7, the changing arm 2, and the supporting member 14 of the changing arm 2. Furthermore, a guide rail 41, being configured into the shape of an inverted trapezoid, and the feed screw nut 17 are attached on the base 40 of the tool-changing unit 9. Meanwhile, the tool-changer holding table 43 is a flat plate having a U-shaped cutout. Two guides 42, each having a groove shaped into an inverted trapezoid, are provided on a straight portion of a surface opposing to the base 40 of the tool-changing unit 9, at both sides of the upper U-shaped cutout. These guides are fixed, in the upright condition, to the machine-tool fixing portion 16.

The inverted-trapezoid-shaped guide rail 41 provided on the base 40 of the tool-changing unit 9 is coupled into the inverted-trapezoid-shaped groove of the guide 42 attached on the tool-changer holding table 43. The tool-changer holding table 43 causes the tool-changing unit 9 to slide in the Z-axis direction, and accordingly restricts the movement of the tool-changing unit 9 in the X- and Y-axis directions. With this arrangement, the tool-changer holding table 43 and the tool-changing unit 9 can slide together, in an overlapped condition, in the Z-axis direction. In the slide-shifting operation, the main body 13 and the second motor 7 protruding upward from the base 40 of the tool-changing unit 9 can enter into the U-shaped cutout of the tool-changer holding table 43. Thus, no interference occurs between these elements.

The feed screw 5 and the first motor 6 are attached on the tool-changer holding table 43. The feed screw 5 is parallel to the guide rail 41, and is screwed into the feed screw nut 17 attached on the base 40 of the tool-changing unit 9. Furthermore, the feed screw 5 and the first motor 6 are coaxially connected. With this arrangement, the tool-changing unit 9 can shift in the Z-axis direction when the first motor 6 rotates. Furthermore, the tool spindle 3 is parallel to the Z axis when it is located at the tool-changing position. Thus, in the tool-changing position, the tool spindle 3 is parallel to the center line of the feed screw shaft 21. According to the third embodiment of the present invention, the tool-changing unit 9 holds and rotates the tool on the same side as the second motor. Therefore, as shown in FIG. 9, the main body 13 of the tool-changing unit 9, the base 40, the second motor 7, the feed screw nut 17, the guide rail 41, the tool-changer holding table 43, and the guide 42 can be disposed inside a minimum rotation circle 45 of a tool held by the changing arm 2.

As in the first embodiment of the present invention, the second motor 7, the supporting member 14, the changing arm 2, and the joint 19 are attached to the main body 13 of the tool-changing unit 9. Like the feed screw shaft 21, the rotating axis 22 is parallel to the tool spindle 3 that is located at the tool-changing position. Furthermore, according to the third embodiment of the present invention, the tool magazine 4A has an arrangement similar to that of the first embodiment, which is characterized in that the rotary tool pot 31 rotates about the axis parallel to the X axis. The supporting member 14 is, for example, a simple bearing unit, or a compact planetary-gear-type reduction unit when a large arm rotational torque is required for supporting a heavy tool.

Next, a tool-changing operation according to the third embodiment of the present invention will be explained with reference to FIGS. 10 and 11A-11D. Those portions or elements identical with or similar to those disclosed in the first embodiment are denoted by the same reference numerals, and their repeated descriptions are omitted. The third embodiment of the present invention discloses the tool changer 1 incorporated in a vertical-type machining center.

(1) The first tool magazine 4A stores a replacement tool TB. The tool spindle 3, located in a machining area, is machining a workpiece 51 fixed on the table 50. Furthermore, the tool-changing unit 9 is first located at the lowest position in the Z-axis direction (hereinafter referred to as a storing position). In this storing position, the angle of the changing arm 2 is set to a predetermined angle so as to avoid any interference with other devices (refer to FIG. 10).

(2) The tool-changing unit 9 shifts in the Z-axis direction from the lowest storing position to the waiting position when the feed screw 5 rotates, so that the tool-changing unit 9 can receive a tool at the waiting position. In this case, as in the first embodiment of the present invention, the changing arm 2 forms an angle of 90 degrees or less relative to the position where the changing arm 2 delivers the tool (refer to FIG. 11A).

(3) Then, the tool-changing magazine 4A is turned to index the replacement tool TB to the tool pickup position. Then, the rotary tool pot 31 is rotated to bring the tool TB into the waiting position (refer to FIG. 11A).

Figure 11A:
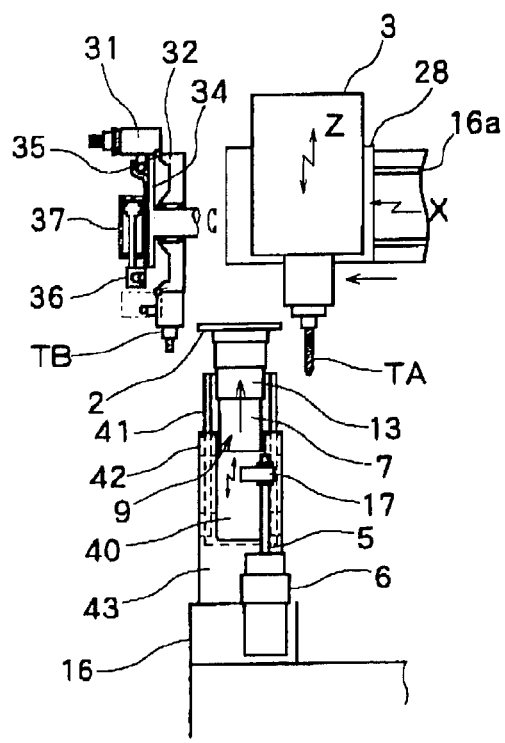
FIGS. 11A to 11D are views explaining the tool-changing operation according to the third embodiment.

(4) Then, the tool spindle 3 with the attached tool TA currently being used shifts along the guide rails 16a extending in the X-axis direction and stops at an exchange position (refer to FIG. 11A).

Figure 11B:
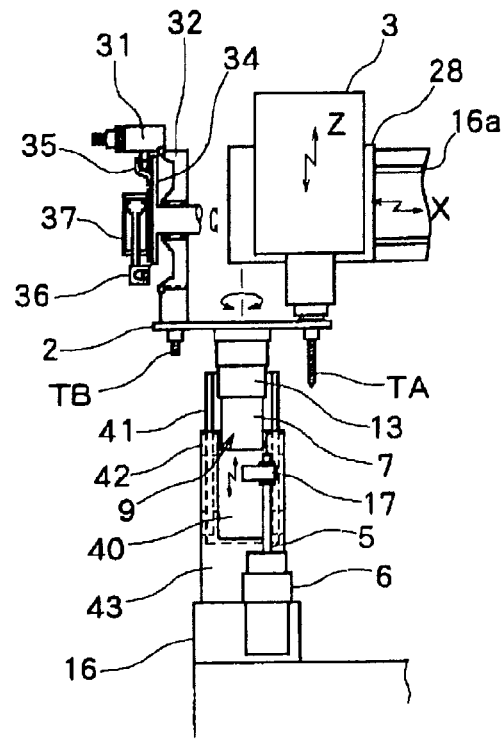

(5) Then, the second motor 7 rotates the changing arm 2 to hold the replacement tool TB with one tool holder and also hold the used tool TA with the other tool holder (refer to FIG. 11B)

Figure 11C:
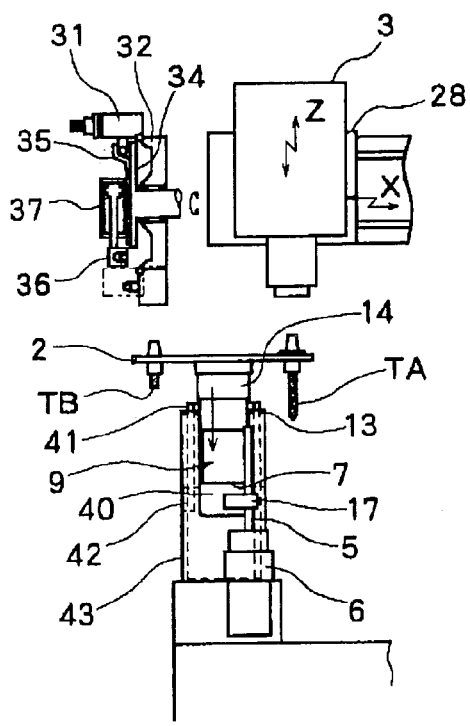
Figure 11D:
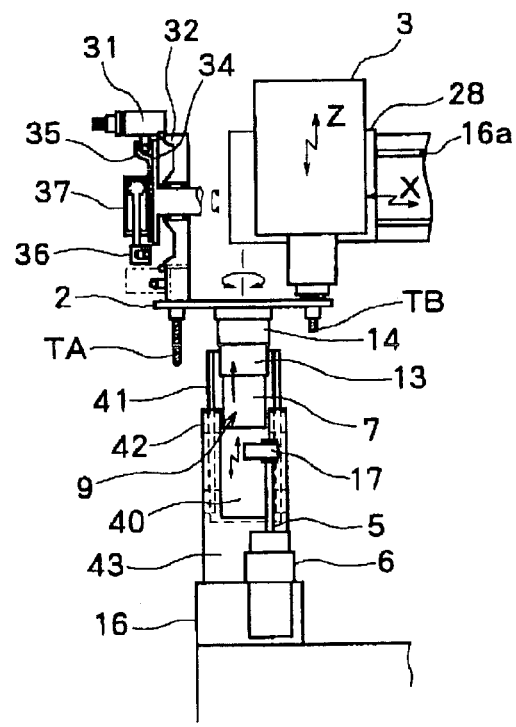
Figure 12:
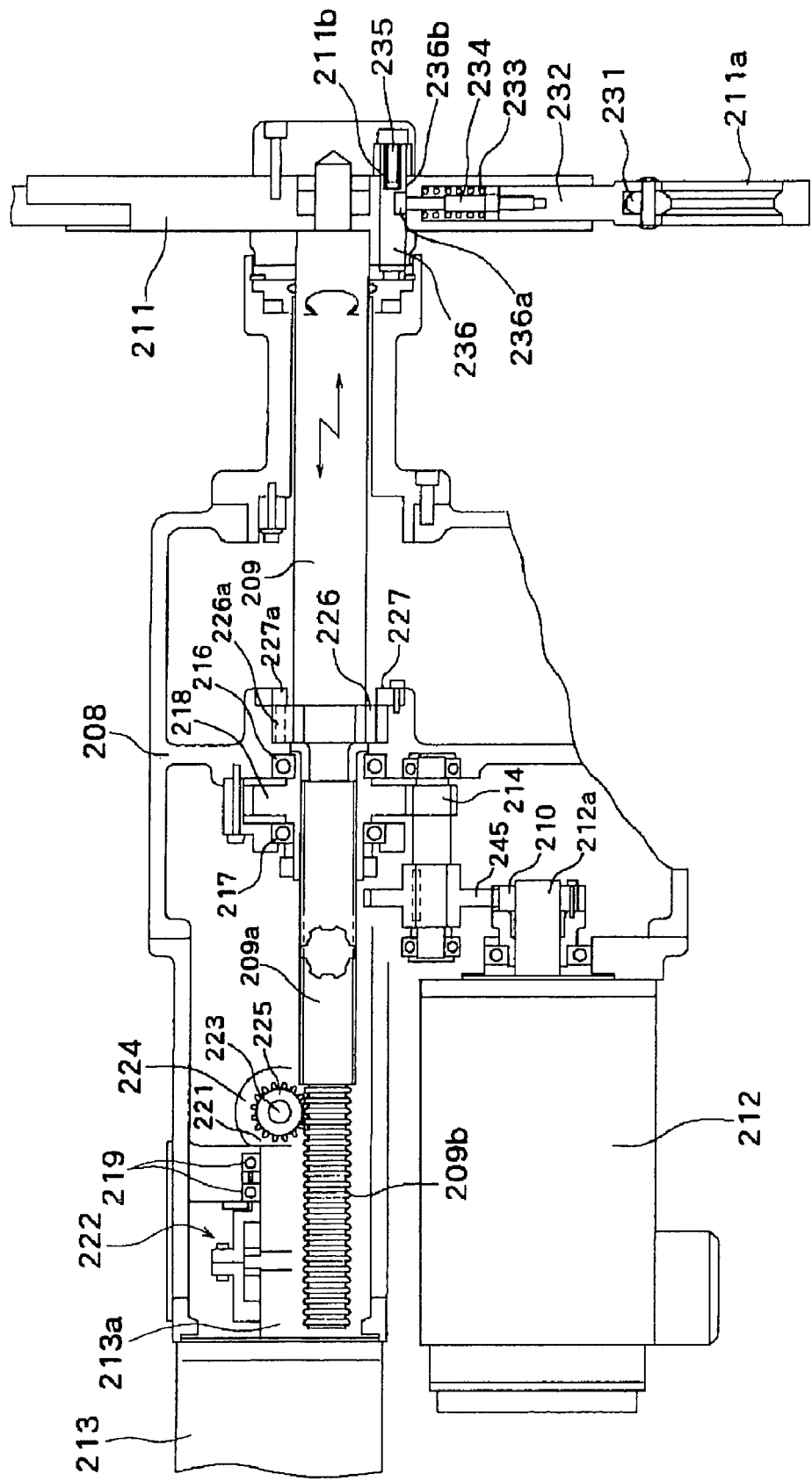
FIG. 12 is a cross-sectional view showing a conventional motor-driven tool changer.
Figure 13:
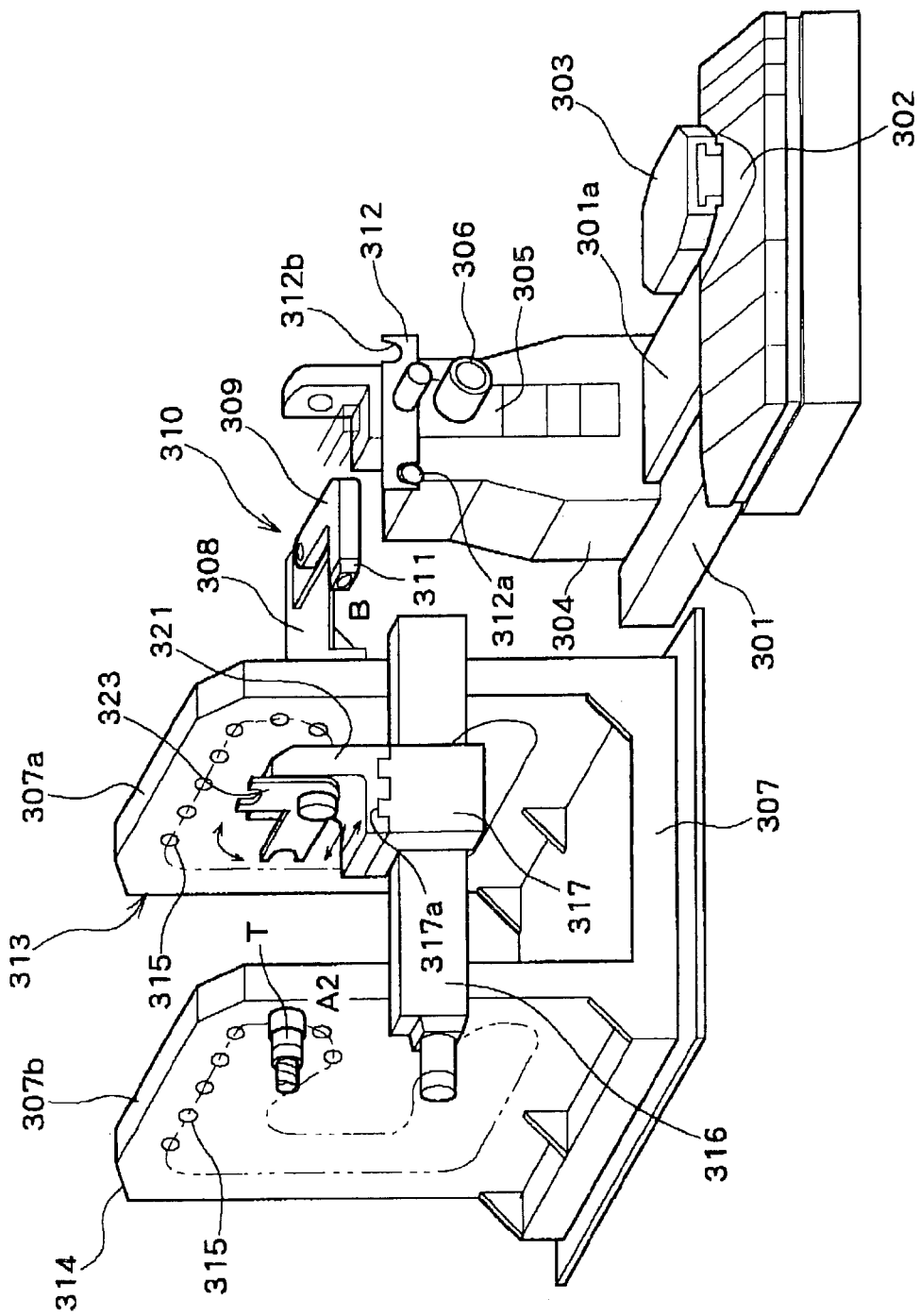
FIG. 13 is a perspective view showing a conventional tool changer provided for a plurality of magazines.

(6) When the changing arm 2 receives the tools, the first motor 6 rotates the feed screw 5 in the opposite direction to cause the tool-changing unit 9 to shift downward away from the tool spindle 3 along the Z axis, thereby detaching the used tool TA from the tool spindle 3 (refer to FIG. 11C).

(7) Then, the second motor 7 rotates the changing arm 2 until the axis of the replacement tool TB is aligned with the axis of the tool spindle 3 and the axis of the used tool TA is aligned with the axis of the rotary tool pot 31. Then, the first motor 6 rotates the feed screw 5 to cause the tool-changing unit 9 to lift toward the tool spindle 3 along the Z axis, thereby attaching the replacement tool TB to the tool spindle 3 and, at the same time, attaching the used tool TA to the rotary tool pot 31 (refer to FIG. 11D).

(8) Then, in the waiting position, the angle of the changing arm 2 is set to the initial angle, in order to avoid any interference with other devices (refer to FIG. 11A).

(9) Then, the first motor 6 rotates the feed screw 5 to lower the tool-changing unit 9 in the Z-axis direction until the tool-changing unit 9 reaches the storing position. Furthermore, in the storing position, the angle of the changing arm 2 is set to the initial angle, in order to avoid any interference with other devices (refer to FIG. 10).

Through these steps, the tool-changing operation is accomplished.

Although the third embodiment has been explained by reference to a system using only one tool magazine, a plurality of tool magazines disposed in the axial direction of the feed screw 5 may be used so that numerous tools can be prepared for a long-duration machining operation as described in the first embodiment. In this case, as in the first embodiment, the tool-changing unit 9 shifts between a tool delivery position of the remotest tool magazine and a tool delivery position of the tool spindle 3.

As described above, the third embodiment of the present invention does not differ from the first embodiment, in that the system can realize both the shifting of a tool and the detachment/attachment of the tool by using the first motor 6 that rotates the feed screw 5. Thus, the third embodiment of the present invention can provide a compact tool changer capable of increasing operation accuracy with an integrated structure. The tool-changing operation can be speedily accomplished. Especially, the tool-changing unit 9 can be disposed at a lower portion of the machine tool which is spaced from the guide rails 16a of the tool spindle 3 and the tool magazine 4A. The tool changing unit 9 is not necessarily disposed between the tool spindle 3 and the tool magazine. The clearance between the central axis of the tool spindle 3 and the central axis of the standing tool pot 31 of the tool magazine 4 can be reduced to a level equivalent to the diameter of a center circle of the tool held by the changing arm 2. With this arrangement, the machine tool can be further simplified in overall layout and becomes compact. Furthermore, by locating beforehand the changing arm 2 to a standby position preferable for executing the tool-changing operation, the tool-changing operation can be accomplished quickly. Thus, the time required for the tool-changing operation can be shortened. Moreover, the tool changer 1 can be disposed in a storing position outside the machining area, positioned at the lower part of the machine tool, which is far from the tool magazine 4. In this case, the tool changer 1, not in use, remains in this storing position. The tool changer 1 can shift forward from the storing position to the exchange position to perform the tool-changing operation. The overall arrangement becomes compact. In order to maintain the tool changer 1 clean, the storing position of the tool changer is preferably surrounded with a shutter. According to the above-described third embodiment, the tip of a tool held by the changing arm 2 is positioned at the same side as the second motor 7. This is effective in realizing a compact arrangement. However, the present invention is not limited to such an arrangement. For example, the tip of a tool held by the changing arm 2 is preferably positioned at a position opposed to the second motor 7. In this case, the main body 13 of the tool-changing unit 9, the base 40, the second motor 7, the feed screw nut 17, the guide rail 41, the tool-changer holding table 43, and the guide 42 may be partially positioned outside the minimum rotation circle 45 of the tool held by the changing arm 2. With this arrangement, the tool changer 1 can be provided at an upper portion adjacent to the tool magazine while the exchange apparatus for the table 50 can be disposed at a lower portion.

Fourth Embodiment

Next, an operation of a fourth embodiment of the present invention will be explained with reference to FIG. 4A and FIG. 4B. The fourth embodiment of the present invention relates to tool length correction, tool diameter correction, or tool breakage detection that is performed by utilizing the function of shifting the tool-changing unit 9 by means of the feed screw 5. Two methods can be employed. One method uses a combination of a non-contact sensor 25A and contact sensor 26. The other method uses a combination of a non-contact sensor 25B and the contact sensor 26. The non-contact sensor 25 is, for example, a laser-type sensor.

Hereinafter, the method of using the non-contact sensor 25B and the contact sensor 26 to detect the presence of any tool breakage or any change of the tip position resulting from wear and tear will be explained.

(1) First, the tool magazine 4A is turned to index the replacement tool TB to the exchange position.

(2) The first motor 6 rotates the feed screw 5 to shift the tool-changing unit 9 until the non-contact sensor 25B attached on the main body 13 of the tool-changing unit 9 can detect the tip of the replacement tool TB with its laser beam 25Ba.

(3) At the time the non-contact sensor 25B detects the tip of the replacement tool TB, a numerical controller of the machine tool obtains (i.e. calculates) a tool diameter or a tool length of the replacement tool TB on the basis of the output of the non-contact sensor 25B.

(4) Then, the first motor 6 rotates the feed screw 5to shift the tool-changing unit 9 until the changing arm 2 of the tool-changing unit 9 comes to the same position as the tool magazine 4A. Additionally, the ready station tool pot 20 delivers the replacement tool TB to the changing arm 2 of the tool-changing unit 9.

(5) Then, the first motor 6 rotates the feed screw 5 to shift the tool-changing unit 9 in the Z-axis direction until the replacement tool TB held by the changing arm 2 is brought into contact with the contact sensor 26.

(6) When the replacement tool TB hits the contact sensor 26 as indicated by a dotted line in FIG. 4A, the numerical controller of the machine tool obtains the tip position of the replacement tool TB on the basis of a rotational position of the first motor 6 and compares the obtained tip position with pre-memorized tool data, thereby detecting the existence of any tool breakage or tip position change caused by wear and tear.

As described above, the fourth embodiment of the present invention can easily detect the existence of any tool breakage or tip position change caused by wear and tear, by utilizing the shifting of the tool-changing unit 9 that is driven by the first motor 6 via the feed screw 5. Hence, the fourth embodiment of the present invention can realize a sequential operation including not only exchange of tools but also detection of tool breakage or wear and tear. The work can be speedily accomplished. Additionally, long-duration, automated operation is feasible.

Fifth Embodiment

Next, a fifth embodiment of the present invention will be explained with reference to FIG. 3. The fifth embodiment discloses a method of using the non-contact sensor 25A and the contact sensor 26 to perform tool length correction, tool diameter correction, or tool breakage detection.

(1) First, the replacement tool TB is delivered from the rotary tool pot 31 to the changing arm 2.

(2) Then, the first motor 6 rotates the feed screw 5 to shift the tool-changing unit 9 in the Z-axis direction until the non-contact sensor 25A can detect the tip of the replacement tool TB with its laser beam 25Aa.

(3) At the time the non-contact sensor 25A detects the tip of the replacement tool TB, the numerical controller of the machine tool obtains (calculates) a tool diameter or a tool length of the replacement tool TB on the basis of the output of the non-contact sensor 25A.

(4) Then, the first motor 6 rotates the feed screw 5 to shift the tool-changing unit 9 until the replacement tool TB held by the changing arm 2 is brought into contact with the contact sensor 26.

(5) When the replacement tool TB hits the contact sensor 26 as indicated by a dotted line in FIG. 3, the numerical controller of the machine tool obtains the tip position of the replacement tool TB on the basis of a rotational position of the first motor 6 and compares the obtained tip position with pre-memorized tool data, thereby detecting the existence of any tool breakage or tip position change caused by wear and tear.

The fifth embodiment is also applicable to the second embodiment explained with reference to FIGS. 4A and 4B.

Hence, like the fourth embodiment of the present invention, the fifth embodiment can realize a sequential operation including not only exchange of tools but also detection of tool breakage or wear and tear. The work can be speedily accomplished. Additionally, long-duration automated operation is feasible. The above-described embodiments use the contact sensor 26 for the tool length correction and the tool breakage detection. However, this sensor can be replaced with a non-contact-type sensor like the sensor obtaining the tool diameter. The type of the non-contact sensor is not limited to the laser-type sensors 25Aa and 25Ba shown in FIG. 4A. Accordingly, any other non-contact sensor can be used.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A tool changer used for exchanging tools between a tool magazine and a tool spindle of a machine tool, comprising:
   a tool-changing unit including a main body of a tool-changing unit, a tool changing arm, a rotating drive motor which is attached to said main body of tool-changing unit and which rotates said tool changing arm, and a rotating shaft, with said tool changing arm attached to one end of said rotating shaft and said rotating drive motor attached to the other end of said rotating shaft;

a guide assembly for guiding said tool-changing unit in a shift direction; and a feed drive motor which is attached to a fixing section of a machine tool and which feeds and drives said tool changing unit in said shift direction; and a feed screw having one end to which said feed drive motor is attached and which is screwed into said tool-changing unit to permit said tool-changing unit to access a tool from a remote location along said shift direction and also to permit detachment/attachment of the tool along said shift direction, wherein said feed screw and said guide assembly positioned parallel to a rotational axis of the tool spindle positioned at a tool-changing position.

2. The tool changer according to claim 1, further comprising a planetary-gear-type reduction unit interposed between and serving to couple said changing arm to said rotating drive motor.

3. The tool changer according to claim 1, wherein said feed screw is disposed outside a maximum rotation circle of the tool held by said changing arm.

4. The tool changer according to claim 1, wherein said feed screw is disposed inside a minimum rotation circle of the tool held by said changing arm.

5. The tool changer according to claim 1, wherein a plurality of tool magazines are disposed along said feed screw within a feed shifting range of said tool changing unit.

6. A machine tool equipped with a tool changer according to claim 1, comprising:

a detector, located in close proximity to a shifting locus of the tool held by the changing arm within a feed shifting range of the tool-changing unit, for measuring a tool length and a tool diameter of the tool, and a unit configured to execute, on the basis of an output of said detector, tool length correction and tool breakage detection by utilizing a feed shifting operation of said tool-changing unit.

7. A machine tool equipped with a tool changer according to claim 1, comprising:

a detector attached to the tool-changing unit, and a unit configured to measure, on the basis of an output of said detector, a tool diameter or a tool length of the tool magazine by utilizing a feed-shifting operation of said tool-changing unit.

8. The tool changer according to claim 1, wherein said guide assembly includes at least one guide member and a guide rail such that the guide member rides along the guide rail.

9. The tool changer according to claim 8, wherein said at least one guide member is provided on said main body of said tool-changing unit.

10. The tool changer according to claim 8, wherein said guide rail is provided on said main body of said tool-changing unit.

11. A tool changer comprising:

a tool-changing unit including a main body of a tool-changing unit, a tool changing arm, a rotating drive motor which is attached to said main body of tool changing unit and which rotates said tool changing arm, and a rotating shaft, with said tool changing arm attached to one end of said rotating shaft and said rotating drive motor attached to the other end of said rotating shaft;

a guide assembly for guiding said tool-changing unit in a shift direction, said guide assembly being positioned parallel to a rotational axis of a tool spindle positioned at a tool-changing position;

a feed drive motor which is attached to a fixing section of a machine tool and which feeds and drives said tool changing unit in said shift direction; and a feed screw having one end to which said feed drive motor is attached and which is screwed into said tool-changing unit to shift said tool-changing unit along said guide assembly to access a tool from a remote location along said guide assembly, wherein said feed drive motor rotates said feed screw to permit said tool-changing unit to shift from a storing position and stop at a tool delivery position where a tool is detached /attached from a tool magazine and at a tool-changing position where the tool is detached /attached to said tool spindle, while rotation of said feed screw is utilized to perform detachment/attachment of the tool at said tool delivery position as well as at said tool-changing position, and said tool-changing unit rotates said changing arm at said tool delivery position as well as at said tool-changing position by said rotating drive motor.

12. The tool changer according to claim 11 further comprising a planetary-gear-type reduction unit interposed between and serving to couple said changing arm to said rotating drive motor.

13. The tool changer according to claim 11, wherein said feed screw is disposed outside a maximum rotation circle of the tool held by said changing arm.

14. The tool changer according to claim 11, wherein said feed screw is disposed inside a minimum rotation circle of the tool held by said changing arm.

15. The tool changer according to claim 11, wherein a plurality of tool magazines are disposed along said feed screw within a feed shifting range of said tool-changing unit.

16. A machine tool equipped with a tool changer according to claim 11, comprising:

a detector, located in close proximity to a shifting locus of the tool held by the changing arm within a feed-shifting range of the tool changing unit, for measuring a tool length and a tool diameter of the tool, and a unit configured to execute, on the basis of an output of said detector, tool length correction and tool breakage detection by utilizing a feed-shifting operation of said tool-changing unit.

17. A machine tool equipped with a tool changer according to claim 11, comprising:

a detector attached to the tool-changing unit, and a unit configured to measure, on the basis of an output of said detector, a tool diameter or a tool length of the tool magazine by utilizing a feed-shifting operation of said tool-changing unit.

18. The tool changer according to claim 11, wherein said guide assembly includes at least one guide member and a guide rail such that the guide member rides along the guide rail.

19. The tool changer according to claim 18, wherein said at least one guide member is provided on said main body of said tool-changing unit.

20. The tool changer according to claim 18, wherein said guide rail is provided on said main body of said tool-changing unit.

* * * * *